United States Patent [19]

O'Brien

[11] Patent Number: 5,635,577
[45] Date of Patent: Jun. 3, 1997

[54] ADDITION CURABLE PAPER RELEASE COMPOSITION WITH IMPROVED BATHLIFE

[75] Inventor: Michael J. O'Brien, Clifton Park, N.Y.

[73] Assignee: General Electric Company, Waterford, N.Y.

[21] Appl. No.: 624,890

[22] Filed: Mar. 27, 1996

Related U.S. Application Data

[62] Division of Ser. No. 295,125, Aug. 24, 1994, Pat. No. 5,516,558.

[51] Int. Cl.$^6$ ..................... C08G 77/06
[52] U.S. Cl. ............... 528/15; 528/24; 528/12; 427/387; 427/391; 427/395
[58] Field of Search ............. 427/387, 391, 427/395; 528/15, 12, 24

[56] References Cited

U.S. PATENT DOCUMENTS

| | | |
|---|---|---|
| 3,445,420 | 5/1969 | Kookootsedes et al. . |
| 3,978,025 | 8/1976 | Magne . |
| 4,170,610 | 10/1979 | Deubzer et al. . |
| 4,177,301 | 12/1979 | Smith, Jr. . |
| 4,256,870 | 3/1981 | Eckberg . |
| 4,262,107 | 4/1981 | Eckberg . |
| 4,347,346 | 8/1982 | Eckberg . |
| 4,444,940 | 4/1984 | Polmanteer . |
| 4,448,815 | 5/1984 | Grenoble et al. . |
| 4,476,166 | 10/1984 | Eckberg . |
| 4,587,137 | 5/1986 | Eckberg . |
| 4,774,111 | 9/1988 | Lo . |
| 4,783,552 | 11/1988 | Lo et al. . |
| 4,797,501 | 1/1989 | Mylerly et al. . |
| 4,830,924 | 5/1989 | Dallavia, Jr. . |
| 5,036,117 | 7/1991 | Chung et al. . |
| 5,082,871 | 1/1992 | Eckberg . |
| 5,108,791 | 4/1992 | Chung et al. . |
| 5,125,998 | 6/1992 | Jones et al. . |
| 5,281,656 | 1/1994 | Thayer et al. . |
| 5,370,936 | 12/1994 | Kaiya . |
| 5,432,006 | 7/1995 | Kessel et al. . |
| 5,468,816 | 11/1995 | Hurford et al. . |
| 5,468,828 | 11/1995 | Hurford et al. . |
| 5,516,558 | 5/1996 | O'Brien ................. 427/387 |

OTHER PUBLICATIONS

W. Knoll, "Chemistry and Technology of Silicones"; 2nd Edition; Academic Press; Orlando, Florida; 1986; pp. 230–231 and 392–295.

*Primary Examiner*—Melvyn I. Marquis
*Attorney, Agent, or Firm*—Kenneth S. Wheelock

[57] ABSTRACT

The present invention relates to an inhibitor package that allows for low temperature cure in thermal solventless paper release products while at the same time maintaining reasonable bulk and thin film bath lives.

4 Claims, No Drawings

ADDITION CURABLE PAPER RELEASE COMPOSITION WITH IMPROVED BATHLIFE

This is a divisional of application Ser. No. 08/295,125 filed on 8/24/94 now Pat. No. 5,516,558.

The present invention relates to addition curable paper release composition with improved bath life. More particularly, the present invention relates to an inhibitor package that allows for low temperature cure in thermal solventless paper release products while at the same time maintaining reasonable bulk and thin film bath lives.

BACKGROUND OF THE INVENTION

Organosilicon compositions in which a platinum group metal-containing catalyst is inhibited in its cure-promoting activity at room temperature by the presence of a catalyst inhibitor are well known in the organosilicon art. For example, U.S. Pat. No. 4,256,870 issued to Eckberg teaches a method of producing a coating composition that has an improved bath life by mixing in any order a polysiloxane base polymer, a methylhydrogen crosslinking agent, a platinum catalyst, and diallylmaleate is added as an inhibitor to effectively retard the hydrosilation addition cure reaction of the composition at ambient temperature, but which does not retard the cure at elevated temperature.

U.S. Pat. No. 4,476,166 issued to Eckberg teaches a two-part inhibitor system that produces a solventless silicone release coating with improved bath life and cure time by mixing in any order an olefinorganopolysiloxane, an organohydrogenpolysiloxane as a crosslinking agent, a platinum catalyst, and a blend of diallylmaleate and vinyl acetate as an inhibitor.

U.S. Pat. No. 4,587,137 issued to Eckberg provides novel dual cure silicone compositions comprising (a) a polydiorganosiloxane containing silicon-bonded vinyl radicals and silicon-bonded hydrogen atoms, (b) a free radical photoinitiator such as t-butyl peroxybenzoate or mixtures of t-butyl peroxybenzoate and benzophenone, (c) a precious metal or precious metal containing hydrosilation catalyst, (d) optionally a organohydrogen polysiloxane, (e) optionally an olefin containing polyorganosiloxane, and (f) optionally an organic ester of maleic acid as an inhibitor to selectively retard the thermal addition cure reaction. These compositions were cured by exposure to UV light with the option of subsequently applying a thermal post bake after irradiation.

U.S. Pat. No. 4,262,107 issued to Eckberg provides a one-part or two-part inhibitor system which produces a paper release coating composition with an improved bath life and cure time by mixing in any order a silanol polymer, a methylhydrogen crosslinking agent, a rhodium catalyst, and a low molecular weight silanol endstopped diorganopolysiloxane alone or in combination with a diallylmaleate as an inhibitor.

U.S. Pat. No. 4,774,111 issued to Lo discloses a curable organosilicon composition comprising a component having silicon-bonded hydrogen atoms, a component having silicon-bonded olefinic hydrocarbon radicals reactive therewith, a platinum-containing catalyst and an effective amount of a diorgano fumarate cure control, i.e., catalyst inhibitor, component.

U.S. Pat. No. 4,783,552 issued to Lo et al. teaches that organosilicon compositions which cure by way of a metal-catalyzed reaction of silicon-bonded hydroxyl radicals and/ or silicon-bonded olefinic hydrocarbon radicals with silicon-bonded hydrogen atoms are stabilized for hours at room temperature by the incorporation of a hydrocarbonoxyalkyl maleate.

U.S. Pat. No. 3,445,420 issued to Kookootsedes et al. provides a mixture of an olefin containing organosilicon polymer, an organosilicon compound containing silicon-bonded hydrogen atoms, a platinum catalyst and an acetylenic compound as inhibitor.

The maleates have been found to be particularly effective for increasing the room temperature bath life, i.e., work time, of solventless coating organosilicon compositions which cure by way of a platinum group metal-catalyzed reaction. However, the heating time and/or temperature needed to cure in these maleate-inhibited systems is sometimes excessive. When one attempts to decrease the cure time and/or temperature of silicone compositions to a commercially desirable interval by using less maleate and/or more catalyst in these inhibitor systems the bath life is frequently decreased to a commercially undesirable interval.

The fumarate inhibitor systems have been found to allow a cure of a solventless coating organosilicon compositions which cure by way of a platinum group metal-catalyzed reaction to take place at a suitable heating time and/or temperature. However, the bath life of such a composition, as measured by gel time at room temperature, is not as long as desired. When one attempts to increase the bath life of these compositions by increasing the amount of fumarate and or decreasing the amount catalyst in the fumarate inhibitor systems the cure and/or temperature increases.

In the coating arts, such as the paper coating art, the coating composition that is used to coat a substrate should not cure to the extent that its viscosity has increased substantially before it has been applied to the substrate; however, it should rapidly cure thereafter, preferably with only a moderate amount of added energy. Typically this means that the coating compositions preferably should not gel for as long as eight hours but should cure rapidly at moderately increased temperature to such an extent that the coated substrate can be further processed, if desired, without damaging the coating. In addition, the cure time of the composition at a given cure temperature desirably should remain substantially constant as the bath ages. Room temperature stability in a thin film is also important in this art, especially in 3-roll differential gravure coating where premature gelation of the material can clog the cells in the gravure roll thereby leading to a drop in silicone coatweight. In other coating methods such as 5-roll coating, insufficient thin film bath life can lead to the formation of residue on the rolls, thus leading to increased downtime for cleaning.

U.S. Pat. No. 5,036,117 issued to Chung et al. discloses that the bulk room temperature bath life of paper release formulations containing these types of inhibitors can be further extended without seriously effecting high temperature cure by adding substantially non-inhibitors such as benzyl alcohol. Chung et al. teaches that the preferred bath life extenders can be any organic or inorganic compound which is free of an inhibiting effect and has a Hansen partial solubility parameter for hydrogen bonding of 8.0, preferably 13–48, and is free of steric hindrance in the polar portion of the molecule (See column 11, lines 65–68 and column 12, lines 1–11).

U.S. Pat. No. 5,125,998 issued to Jones et al. provides a method for improving the bath life and/or cure time of curable compositions. The process comprises first mixing an inhibitor with a catalyst, then adding that mixture to an organosilicon compound, and then adding the resulting mixture to an organohydrogensilicon compound. The process can optionally comprise a bath life extender as taught by Chung et al.

While the art has proposed and provided some solutions for the problem, the quest for the ideal inhibitor package that allows for low temperature cure thermal solventless paper release products while at the same time maintaining reasonable bulk and thin film bath lives continues.

SUMMARY OF INVENTION

The present invention provides a curable organosilicon composition comprising (A) a component having silicon-bonded olefinic hydrocarbon radicals reactive therewith; (B) a component having silicon-bonded hydrogen atoms; (C) a platinum-containing catalyst;, (D) an effective amount of an inhibitor sufficient to retard the reaction at room temperature but insufficient to prevent the reaction at elevated temperature; and (E) an effective amount of a perester.

It has been surprisingly discovered that peresters such as t-butyl peroxybenzoate (hereinafter "TBPB") which have weak inhibitory capability by themselves, have a synergistic effect on the bulk bath life stabilizing potential of a variety of inhibitors, including maleates. This is particularly surprising in that these materials have sterically hindered tertiary alkyl groups in the polar portion of their structure and furthermore are classically thought of not as inhibitor but as catalysts for the thermal crosslinking of polysiloxanes. See W. Knoll, "Chemistry and Technology of Silicones"; 2nd Edition; Academic Press; Orlando, Fla.; 1986; pp.230–231 and 392–395.

Furthermore, it has been found that addition of peresters to typical paper release formulations containing vinyl silicone, platinum catalyst, maleate cure inhibitor and methyl hydrogen functional silicone crosslinker provides enhanced stability at low temperatures.

TBPB is especially effective at improving the bulk bath life stability of inhibitors such as dibutyl maleate (hereinafter "DBM") and bis(2-ethylhexyl)maleate (hereinafter "BEHM"). These inhibitors are effective at providing thin film stability. Therefore, blends of inhibitors such as DBM with TBPB provide a good mixture of bulk and thin film stability.

DETAILED DESCRIPTION OF THE INVENTION

The present invention to a curable composition comprising (A) an organosilicon compound having an average of at from one to three silicon-bonded monovalent radicals per silicon atom selected from the group consisting of hydrocarbon and halohydrocarbon radicals, there being an average of at least two of said monovalent radicals, per molecule of Component (A), selected from the group consisting of olefinic hydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms, (B) an organohydrogensilicon compound containing at least two silicon-bonded hydrogen atoms per molecule thereof and an average of from one to two silicon-bonded monovalent radicals free of aliphatic unsaturation, per silicon atom, selected from the group consisting of hydrocarbon and halohydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon either radicals and halohydrocarbon radicals, said divalent radicals linking silicon atoms, (C) a platinum group metal-containing catalyst in sufficient amount to accelerate a curing reaction among said silicon-bonded olefinic hydrocarbon radicals with said silicon-bonded hydrogen atoms at room temperature, (D) an inhibitor compound for said platinum-containing catalyst sufficient to retard said reaction at room temperature but insufficient to prevent said reaction at elevated temperature, and (E) a perester in a total amount sufficient to further retard said platinum-containing catalyst at room temperature.

Herein the term "curable" as applied to compositions of this invention, generally denotes a chemical change which leads to a change in the state of the composition from a liquid to a solid.

The curing of the compositions of this invention is accomplished by a reaction between silicon-bonded hydroxy and/or olefinic hydrocarbon radicals in Component (A) and silicon-bonded hydrogen atoms in Component (B). The curing of the composition of this invention is controlled by the platinum group metal-containing catalyst Component (C), the inhibitor Component (D) and the perester. The components are delineated as follows.

Broadly stated, Component (A) of the compositions of this invention can be any organosilicon compound containing two or more silicon atoms linked by divalent radicals and containing an average of from 1 to 3 silicon-bonded monovalent radicals per silicon, with the proviso that the organosilicon compound contains at least two silicon-bonded olefinic hydrocarbon radicals. This component can be a solid or a liquid, free flowing or gum-like.

Examples of said divalent radicals linking silicone atoms in Component (A) include oxygen atoms, which provide siloxane bonds, and aliphatically saturated hydrocarbon, hydrocarbon ether, halohydrocarbon ether and halohydrocarbon radicals which provide silcarbane bonds. The divalent radicals can be the same or different, as desired.

Examples of suitable divalent hydrocarbon radicals include any alkylene radical, such as $-CH_2-$, $-CH_2CH_2-$, $CH_2(CH_3)CH-$, $-(CH_2)_4-$, $-CH_2CH(CH_3)CH_2-$, $-(CH_2)_6-$ and $-(CH_2)_{18}-$; cycloalkylene radical, such as cyclohexylene; arylene radical, such as phenylene and combinations of hydrocarbon radicals, such as benzylene, i.e. $-C_6H_4CH_2-$.

Examples of suitable divalent halohydrocarbon radicals include any divalent hydrocarbon radical wherein one or more hydrogen atoms have been replaced by halogen, such as fluorine, chlorine or bromine. Preferable divalent halohydrocarbon radicals have the formula $-CH_2CH_2C_nF_{2n}CH_2CH_2-$ wherein n has a value of from 1 to 10 such as, for example, $-CH_2CH_2CF_2CF_2CH_2CH_2-$.

Examples of suitable divalent hydrocarbon ether radicals and halohydrocarbon ether radicals include $-CH_2CH_2OCH_2CH_2-$, $-CH_2CH_2CF_2OCF_2CH_2CH_2-$, $-CH_2CH_2OCH_2CH_2CH_2-$ and $-C_6-H_4-O-C_6H_4-$.

Examples of said monovalent radicals in Component (A) include halohydrocarbon radicals free of aliphatic unsaturation and hydrocarbon radicals.

Examples of suitable monovalent hydrocarbon radicals include alkyl radicals, such as $CH_3-$, $CH_3CH_2-$, $(CH_3)_2CH-$, $C_8H_{17}-$, $C_{10}H_{21}-$ and $C_2OH_{41}-$; cycloaliphatic radicals, such as cyclohexyl; aryl radicals, such as phenyl, tolyl, xylyl, anthracyl and xenyl; aralkyl radicals, such as benzyl and 2-phenylethyl; and olefinic hydrocarbon radicals, such as vinyl, allyl, methallyl, 3-butenyl, 5-hexenyl, 7-octenyl, cyclohexenyl and styryl. Alkenyl radicals are preferable terminally unsaturated. Of the higher alkenyl radicals those selected from the group consisting of 5-hexenyl, 7 octenyl, and 9-decenyl are preferred because of the more ready availability of the alpha, omega-dienes used to prepare the alkenylsiloxanes. Highly preferred monovalent hydrocarbon radical for the silicon-containing components of the compositions of this invention are methyl, phenyl, vinyl and 5-hexenyl. Examples of suitable aliphatically saturated monovalent halohydrocarbon radicals include any monovalent hydrocarbon radical which is free of aliphatic unsaturation and has at least one of its hydrogen atoms replaced with halogen, such as fluorine, chlorine or bromine. Preferable monovalent halohydrocarbon radicals have the formula $C_nF_{2n+1}CH_2CH_2$— wherein n has a value of from 1 to 10, such as, for example, $CF_3CH_2CH_2$— and $C_4F_9CH_2CH_2$—.

Component (A) of the compositions of this invention is typically an organopolysiloxane having the average unit formula $R_c^2SiO_{(4-c)/2}$ wherein R2 denotes said monovalent radicals, delineated and limited above, and c has a value of from 1 to 3, such as 1.2, 1.9, 2.0, 2.1, 2.4, and 3.0. Suitable siloxane units in the organopolysiloxanes having the above average unit formula have the formulae $R_3^2SiO_{1/2}$, $R_2^2SiO_{2/2}$, $R_2SiO_{3/2}$ and $SiO_{4/2}$. Said siloxane units can be combined in any molecular arrangement such as linear, branched, cyclic and combinations thereof, to provide organopolysiloxanes that are useful as Component (A).

A preferred organopolysiloxane Component (A) for the composition of this invention is a substantially linear organopolysiloxane having the formula $XR_2SiO(XRSiO)_xSiR_2X$. By substantially linear it is meant that the component contains no more than trace amounts of silicon atoms bearing 3 or 4 siloxane linkages. It is to be understood that the term substantially linear encompasses organopolysiloxanes which can contain up to about 15 percent by weight cyclopolysiloxanes which are frequently co-produced with the linear organopolysiloxanes.

In the formula shown immediately above each R denotes a monovalent hydrocarbon or halohydrocarbon radical free of aliphatic unsaturation and having from 1–20 carbon atoms, as exemplified above. The several R radicals can be identical or different, as desired. Additionally, each X denotes an R radical or an olefinic hydrocarbon radical having from 2–12 carbon atoms, as exemplified above. Of course, at least two X radicals are olefinic hydrocarbon radicals.

The value of the subscript x in the above formula is such that the linear organopolysiloxane (A) has a viscosity at 25° C. of at least 25 millipascal-seconds (25 centipoise). The exact value of x that is needed to provide a viscosity value falling within said limit depends upon the identity of the X and R radicals; however, for hydrocarbyl-terminated polydimethylsiloxane x will have a value of at least about 25.

In terms of preferred monovalent hydrocarbon radicals, noted above, examples of preferred linear organopolysiloxanes of the above formula which are suitable as Component (A) for the composition of this invention include
PhMeViSiO(Me$_2$SiO)$_{100}$SiPhMeVi,
HexMe$_2$SiO(Me$_2$SiO)$_{150}$SiMe$_2$Hex,
ViMe$_2$SiO(Me$_2$SiO)$_{100}$(HexMeSiO)$_2$SiMe$_2$Vi,
ViMe$_2$SiO(Me$_2$SiO)$_{0.95x}$(MeViSiO)$_{0.5x}$SiMe$_2$Vi,
HexMe$_2$SiO(Me$_2$SiO)$_{150}$(HexMeSiO)$_4$SiMe$_2$Hex,
Me$_3$SiO(Me$_2$SiO)$_{0.9x}$(MeViSiO)$_{0.1x}$SiMe$_3$,
Me$_3$SiO(Me$_2$SiO)$_{100}$(MeHexSiO)$_8$SiMe$_3$,
PhMeViSiO(Me$_2$SiO)$_{0.93x}$(MePhSiO)$_{0.07x}$SiPhMeVi and
ViMe$_2$SiO(Me$_2$SiO)$_x$SiMe$_2$Vi
wherein Me, Vi, Hex and Ph denote methyl, vinyl, 5-hexenyl and phenyl, respectively.

For Coating composition of this invention it is highly preferred that the linear organopolysiloxane (A) have the formula XMe$_2$SiO(Me$_2$SiO)$_b$(MeXSiO)$_d$SiMe$_2$X wherein X is noted above and the sum of b plus d is equal to x, also noted above. The values of the subscripts b and d can each be zero or greater; however, the value of d is typically less than 0.1b such as zero, 0.02b or 0.08b. Examples of highly preferred linear organopolysiloxanes (A) for adhesive-release coating compositions of this invention include
Me$_3$SiO(Me$_2$SiO)$_b$(MeHexSiO)$_d$SiMe$_3$,
Me$_3$SiO(Me$_2$SiO)$_b$(MeViSiO)$_d$SiMe$_3$,
HexMe$_2$SiO(Me$_2$SiO)$_b$(MeHexSiO)$_d$SiMe$_2$Hex and
ViMe$_2$SiO(Me$_2$SiO)$_b$(MeViSiO)$_d$SiMe$_2$Vi In a preferred embodiment of the present invention, wherein the curable composition, preferably solventless, is used to coat a solid substrate, such as paper, with an adhesive-releasing coating, the value of b plus d in the highly preferred organopolysiloxane (A) is sufficient to provide a viscosity at 25° C., for the Component (A) of at least 100 mPa.s, such as from about 100 mPa.s to about 100 Pa.s, preferable from about 100 mPa.s to 10 Pa.s and, most preferably, from 100 mPa.s to 5 Pa.s; said 25 viscosity's corresponding approximately to values of b+d of at least 60, such as from 60 to 1000, preferably to 520 and, most preferably, to 420.

Broadly stated, Component (B) of the compositions of this invention can be any organohydrogensilicon compound which is free of aliphatic unsaturation and contains two or more silicon atoms linked by divalent radicals, an average of from one to two silicone-bonded monovalent radicals per silicon atom and an average of at least two, and preferably three or more, silicon bonded hydrogen atoms per molecule thereof.

Examples of said divalent radicals linking silicon atoms in Component (B) are as delineated above for Component (A), including preferred examples. As with Component (A), the divalent radicals within Component (B) can be identical or different, as desired. Furthermore, the divalent radicals that are present in Component (B) can, but need not, be the same as the divalent radicals that are present in Component (A).

Examples of said monovalent radicals in Component (B) include hydrocarbon and halohydrocarbon radicals, as delineated above for Component (A) including preferred examples, which are free of aliphatic unsaturation. The monovalent radicals that are present in Component (B) can, but need not, be the same as the monovalent radicals that are present in Component (A).

Component (B) must contain an average of at least two silicon-bonded hydrogen atoms per molecule thereof. Preferably Component (B) contains an average of three or more silicon-bonded hydrogen atoms such as, for example, 5, 10, 20, 40 and more.

Component (B) typically has a 100 percent siloxane structure, i.e., and organohydrogenpolysiloxane structure having the average unit formula $R_e^3H_fSiO_{(4-e-f)/2}$ wherein R3 denotes said monovalent radical free of aliphatic unsaturation, f has a value of from greater that 0 to 1, such as 0.001, 0.01, 0.1 and 1.0 and the sum of e plus f has a value of from 1–2, such as 1.2, 1.9, and 2.0.

Suitable siloxane units in the organohydrogenpolysiloxane having the average unit formula immediately above have the formulae $R_3^3SiO_{1/2}$, $R_2^3HSiO_{1/2}$, $R_2^3SiO_{2/2}$, $R_3HSiO_{2/2}$, $R_2SiO_{3/2}$, $HSiO_{3/2}$, $HSiO_{3/2}$ and $SiO_{4/2}$. Said siloxane units can be combined in any molecular arrangement such as linear, branched, cyclic and combinations thereof, to provide organohydrogenpolysiloxane that are useful as Component (B).

A preferred organohydrogenpolysiloxane Component (B) for the compositions of this invention is a substantially linear organohydrogenpolysiloxane having the formula $YR_2SiO(YRSiO)_ySiR_2Y$ wherein each R denotes a monovalent hydrocarbon or halohydrocarbon radical free of aliphatic unsaturation and having from 1–20 carbon atoms, as exemplified above. The several R radicals can be identical or different, as desired. Additionally, each Y denotes a hydrogen atom or an R radical. Of course, at least two Y radicals must be hydrogen atoms.

The value of the subscript y is not critical: however it is preferably such that the organohydrogenpolysiloxane Component (B) has a viscosity at 25° C., up to 100 millipascal-seconds. The exact value of y needed to provide a viscosity value falling within said limits depends upon the number and identity of the R radicals; however, for organohydrogenpolysiloxanes containing only methyl radicals as R radicals y will have a value of from about 0 to about 100.

In terms of preferred monovalent hydrocarbon radicals, noted above, examples of linear organohydrogenpolysiloxanes of the above formula which are suitable as Component (B) for the Compositions of this invention include
$HMe_2SiO(Me_2SiO)_ySiMe_2H$,
$Me_3SiO(MeHSiO)_ySiMe_3$, $HMe_2SiO(Me_2SiO)_{0.5y}(MeHSiO)_{0.5y}SiMe_2H$,
$HMe_2SiO(Me_2SiO)_{0.5y}(MePhSiO)_{0.1y}(MeHSiO)_{0.4y}SiMe_2H$,
$Me_3SiO(Me_2SiO)_{0.4y}(MeHSiO)_{0.6y}SiMe_3$, $(MeHSiO)y$, $(HMe_2SiO)_4Si$ and $MeSi(OSiMe_2H)_3$.

Highly preferred linear organohydrogenpolysiloxane (B) for the coating compositions of this invention have the formula $YMe_2SiO(Me_2SiO)_p(MeYSiO)_qSiMe_2Y$ wherein Y denotes a hydrogen atom or an R radical, free of aliphatic unsaturation. Again, an average of at least two Y radicals per molecule of Component (B) must be hydrogen atoms. The subscripts p and q can have average values of zero or more and the sum of p plus q has a value equal to y, noted above. For the adhesive-releasing coating compositions of this invention Y should be H or methyl.

The amounts of Components (A) and (B) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

For the liquid coating compositions of this invention which are to be used in the coating method of this invention, hereinbelow delineated, the value of said ratio should have a value of from 1/2 to 3/1, and preferably about 1.2/1–2.5/1.

Organosilicon polymer are, of course, well known in the organosilicon art. Organopolysiloxanes are clearly the most significant and most widely used form of organosilicon polymers in the art, and in this invention; many are commercially prepared. The preparation of the organosilicone components that are used in the compositions of this invention is well documented and needs no intensive delineation herein.

Broadly stated, Component (C) of the composition of this invention is a catalyst component which facilitates the reaction of the silicon-bonded hydrogen atoms of Component (B) with the silicon-bonded olefinic hydrocarbon radicals of Component (A) and can be any platinum-containing catalyst component. For example, Component (C) can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispersibility in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions of this invention is not narrowly limited as long as there is a sufficient amount to accelerate a room temperature reaction between the silicon-bonded hydrogen atoms of Component (B) with the silicon-bonded olefinic hydrocarbon radicals of Component (A). The exact necessary amount of said catalyst component will depend upon the particular catalyst and is not easily predictable. However, for chloroplatinic acid said amount can be as low as one part by weight of platinum for every one million parts by weight of organosilicon Components (A) plus (B). Preferably said amount is at least 10 parts by weight, on the same basis.

For compositions of this invention which are to be used in the coating method of this invention the amount of platinum-containing catalyst component to be used is preferably sufficient to provide from 10 to 500 parts by weight platinum per one million parts by weight of organopolysiloxane Components (A) plus (B).

Component (D) of the compositions of this invention is any material that is known to be, or can be, used as an inhibitor for the catalytic activity of platinum group metal-containing catalysts. By the term "inhibitor" it is meant herein a material that retards the room temperature curing of a curable mixture of Components (A), (B), and (C), when incorporated therein in small amounts, such as less than 10 percent by weight of the composition, without preventing the elevated temperature curing of the mixture. Of course, it is known that materials, such as hydrocarbons, which are not inhibitors when used in solvent amounts, have an inhibiting effect when used in solvent amounts, such as from 35 to 95% by weight. These materials are not considered inhibitors for the purposes of this invention.

Inhibitors for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. No. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. No. 4,256,870; 4,476,166 and 4,562,096, and conjugated ene-ynes, U.S. Pat. No. 4,465,818 and 4,472,563; other organic compounds such as hydroperoxides, U.S. Pat. Nos. 4,061,609; ketones, 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185. It is believed that the compositions of this invention can comprise an inhibitor from any of these classes of inhibitors.

Organic inhibitor compounds which bear aliphatic unsaturation and one or more polar groups, such as carbonyl or alcohol groups, display useful bath life extension benefits when combined with Component (E) of the present invention. Examples thereof include the acetylenic alcohols of Kookootsedes and Plueddemann, U.S. Pat. No. 3,445,420, such as ethynylcyclohexanol and methylbutynol; the unsaturated carboxylic esters of Eckberg, U.S. Pat. No. 4,256,870, such as diallyl maleate and dimethyl maleate; and the maleates and fumatates of Lo, U.S. Pat. No. 4,562,096 and 4,774,111, such as diethyl fumarate, diallyl fumarate and bis-(methoxyisopropyl)maleate. The half esters and amides of Melanchon, U.S. Pat. No. 4,533,575; and the inhibitor mixtures of Eckberg, U.S. Pat. No. 4,476,166 would also be expected to behave similarly. The above-mentioned patents relating to inhibitors for platinum group metal-containing catalysts are incorporated herein by reference to teach how to prepare compounds which are suitable for use as Component (D) in our compositions.

Preferred inhibitors for the compositions of this invention are the maleates and fumarates. The maleates and fumarates have the formula $R^1(OD)_hO_2CCH=CHCO_2(DO)_hR^1$ wherein $R^1$ denotes an hydrocarbon radical having from 1 to 10 carbon atoms and each D denotes, independently, an alkylene radical having from 2 to 4 carbon atoms. $R^1$ can be, for example, an alkyl radical such as methyl, ethyl, propyl, isopropyl, butyl, pentyl or hexyl; an aryl radical such as phenyl or benzyl; an alkenyl radical such as vinyl or allyl; alkynyl radicals; or a cyclohydrocarbon radical such as cyclohexyl. D can be, for example, —$CH_2CH_2$—, —$CH_2(CH_3)CH$—, —$CH_2CH_2CH_2$—, —$CH_2CH_2CH_2CH_2$—, —$CH_2(CH_3CH_2)CH$— and —$CH_2CH_2(CH_3)CH$—. The individual $R^1$ radicals and D radicals of the maleates and fumarates can be identical or different, as desired. The value of subscript h in the formula immediately above can have a value equal to zero or 1. The individual values of h can be identical or different, as desired.

The amount of Component (D) to be used in the compositions of this invention is not critical and can be any amount that will retard the above-described platinum-catalyzed hydrosilylation reaction at room temperature while not preventing said reaction at moderately elevated temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B). The range of Component (D) can be 0.1–10% by weight, preferably 0.15–2% by weight, and most preferably 0.2–1% by weight.

Broadly stated, Component (E) of the compositions of this invention is a perester having the formula

wherein $R^1$ is hydrocarbon or halohydrocarbon radical or O—$R^3$, $R^3$ is a monovalent hydrocarbon radical, $R^2$ is a tertiary alkyl radical. Some of the peresters which can be used are for example

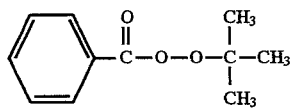

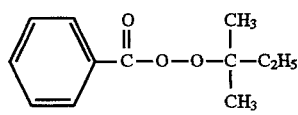

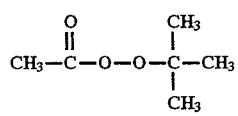

-continued

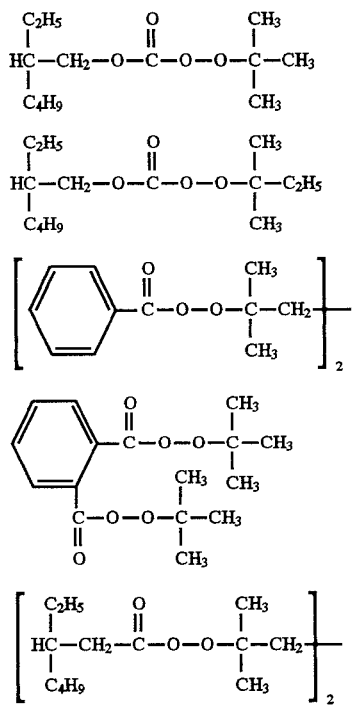

The amount of peresters to be used in the compositions of this invention is not critical and can be any amount that the combination the peresters and the inhibitors will retard the above-described platinum-catalyzed hydrosilylation reaction at room temperature while not preventing said reaction at moderately elevated temperature. For example, the range for component (E) can be 0.1–10%, with 0.1–2% being preferred, and 0.3–1% being most preferred.

The following examples are disclosed to further teach, but not limit, the invention which is properly delineated by the appended claims. All amounts (parts and percentages) are by weight unless otherwise indicated. Viscosities were measured with a rotating spindle viscometer.

EXAMPLE 1 t-Butyl Peroxybenzoate as an Inhibitor

Composition 1 was prepared by combining 10 parts of a 200 cps vinyl dimethyl silyl stopped polydimethyl siloxane polymer containing 25 ppm Pt as a Pt-divinyltetramethyl disiloxane complex with 0.4 parts t-butyl peroxybenzoate, and 0.30 parts of a methyl hydrogen dimethyl polysiloxane crosslinker. The resulting mixture gelled in about 60 mins.

Composition 2 was the same as Composition 1, except no t-butyl peroxybenzoate was added to the system. The resulting mixture gelled in less than three minutes.

Composition 3 was the same as Composition 1, except the mixture was allowed to stand at room temperature overnight before addition of the 0.30 parts of the methyl hydrogen dimethyl polysiloxane crosslinker. The resulting mixture was a free flowing liquid for 5 hours.

The results clearly indicate that t-butyl-peroxybenzoate has a small amount of inhibitive capacity.

EXAMPLE 2 t-Butyl Peroxybenzoate/Maleate Mixed Inhibitor Systems

The following inhibitors were mixed with 100.0 g portions of a blend of a 200 cps vinyl dimethyl silyl stopped polydimethyl siloxane polymer and 150 ppm Pt as a Pt-divinyltetramethyl disiloxane complex:

| Comp. No | Inhibitor (wt in grams) | t-ButylPeroxybenzoate (g) |
|---|---|---|
| 4 | DBM (0.50) | — |
| 5 | DBM (0.50) | 1.0 |
| 6 | BEHM (0.80) | — |
| 7 | BEHM (0.80) | 1.0 |
| 8 | DAM (0.25) | — |
| 9 | DAM (0.25) | 1.0 |

DBM = Dibutyl Maleate
BEHM = Bis (2-ethylhexyl) Maleate
DAM = Diallyl Maleate

Examples 4,6 & 8 correspond to prior art examples whereas examples 5, 7, and 9 correspond to examples of the current invention. To all of these formulations were added 5.0 g of a methyl hydrogen dimethyl polysiloxane crosslinker. After the bubbles dissipated (ca 15 mins) initial viscosities were measured and the viscosities were than monitored over time at room temperature. The results are summarized below:

| Comp. No. | Initial Visc(cps) | 1 Hr Visc (cps) | 2 Hr Visc (cps) | 17 Hr Visc (cps) | 24 Hr Visc (cps) |
|---|---|---|---|---|---|
| 4 | 320 | 560 | 710 | Gel | — |
| 5 | 235 | 255 | 265 | 334 | 375 |
| 6 | 520 | Gel | — | — | — |
| 7 | 265 | 290 | 304 | 498 | 635 |
| 8 | 230 | 265 | 272 | 332 | 365 |
| 9 | 215 | 230 | 234 | 262 | 280 |

These results clearly indicate that the t-butyl peroxybenzoate and maleate mixed inhibitor system has a synergistic effect on enhancing the bulk bath life of these compositions.

EXAMPLE 3

Composition 10 was prepared by combining 10.0 g of the 200 cps vinyl dimethyl silyl stopped polydimethyl siloxane polymer containing 150 ppm Pt as a Pt-divinyltetramethyl disiloxane complex with 0.025 g DAM, and then 0.50 g of the methyl hydrogen dimethyl polysiloxane crosslinker. Composition 11 was prepared in the same way as Composition 10, except 0,050 g DBM and 0.10 g t-butylperoxybenzoate were substituted for the DAM.

A sample of each formulation was coated in a 1 mil film on a plastic substrate and the tack free time as determined at room temperature. In addition, samples of each were drawn down on 42# super calendered kraft (SCK) paper and the minimum curetime at 200° F. was determined by noting at what cure time was required to attain a cured film that did not migrate to Scotch 610 tape. The following results were obtained:

| Comp. No. | Min. Curetime at 200° F. (sec) | Tack Free Time (hrs) |
|---|---|---|
| 10 | 14 | 5 |
| 11 | 13 | >8 but <17 |

This clearly shows that with the same bulk bath life and minimum curetime at 200° F., the DBM/TBPB combination gave better thin film stability than DAM.

EXAMPLE 4

Composition 12 was prepared by combining 2500 g of the 200 cps vinyl dimethyl silyl stopped polydimethyl siloxane polymer containing 150 ppm Pt as a Pt-divinyltetramethyl disiloxane complex with 6.25 g DAM and 125 g of the methyl hydrogen dimethyl polysiloxane crosslinker. Composition 13 was prepared in the same way as Composition 12 except that 12.5 g DBM+25 g TBPB was added as inhibitor.

These formulations were coated via 3-roll differential offset gravure at coatweights of 0.9–1 lb/ream. The coated paper samples were cured by passing the web through a 10 foot oven at 300° F. with oven residence times of both 3 and 6 secs. The resulting release liners were then laminated with Flexcryl 1625 emulsion acrylic adhesive and a 50# smudge proof facestock. The release force (in g/2in) required to separate the constructions at 0.17 m/s (400 in/min) delamination speed and 180° was then monitored over time at room temperature. The following results were obtained:

| Bath | Residence Time (sec) | Initial Release | 1-Day Release | 8-Day Release | 14-Day Release |
|---|---|---|---|---|---|
| 10 | 3 | 52 | 56 | 61 | 64 |
| 12 | 6 | 38 | 42 | 51 | 51.5 |
| 11 | 3 | 30 | 33 | 37 | 41 |
| 13 | 6 | 31 | 34 | 38 | 39.5 |

As can be seen, lower more stable release was exhibited by Composition 13.

EXAMPLE 5

The following inhibitors were mixed with 100.0 g portions of a blend of a 275 cps vinyl dimethyl silyl stopped dimethyl methylvinyl polysiloxane polymer and 100 ppm Pt as a Pt-divinyltetramethyl disiloxane complexs:

| Comp No. | Inhibitor (wt in grams) | t-ButylPeroxybenzoate (g) |
|---|---|---|
| 14 | DAF (0.60) | — |
| 15 | DAF (0.60) | 0.8 |
| 16 | BMMEM (0.80) | — |
| 17 | BMMEM (0.80) | 0.8 |

DAF = Diallyl Fumarate
BMMEM = Bis(Methoxymethyl) Ethyl Maleate

To these formulations were added 5.0 g portions of a trimethylsilyl stopped methyl hydrogen polysiloxane crosslinker. The viscosities were then monitored over time at room temperature as shown below:

| Comp No. | Initial Visc(cps) | 8 Hr Visc (cps) | 24 Hr Visc (cps) | 48 Hr Visc (cps) | 72 Hr Visc (cps) |
|---|---|---|---|---|---|
| 14 | 257 | 339 | 407 | 546 | 871 |
| 15 | 247 | 316 | 368 | 475 | 661 |
| 16 | 260 | 309 | 364 | 549 | 2025 |
| 17 | 249 | 295 | 346 | 474 | 891 |

In addition, minimum curetimes were measured at 250° F. on SCK (time to no smear and no migration to Scotch 610 tape). Compositions 14 and 15 gave minimum curetimes of 15 secs while Compositions 16 and 17 were 13 secs. Therefore, it can be seen that the t-butyl peroxybenzoate aided room temperature stability but did not impair cure at high temperatures.

EXAMPLE 6

Composition 18 was prepared by combining 100.0 g portions of a blend of a 275 cps vinyl dimethyl silyl stopped dimethyl methylvinyl polysiloxane polymer and 100 ppm Pt as a Pt-divinyltetramethyl disiloxane complex with 0.40 g DAF and 7.5 g of a methyl hydrogen dimethyl polysiloxane crosslinker. Composition 19 was prepared in the same way as Composition 18, except 1.5 g t-Amyl Peroxybenzoate (TAPB) was added in the system. The minimum curetimes of these compositions at 225° F. were both found to be 14 sec. In addition, the following viscosity measurements were made over time:

| Comp No. | Initial Visc(cps) | 2 Hr Visc (cps) | 4 Hr Visc (cps) | 8 Hr Visc (cps) | 24 Hr Visc (cps) |
|---|---|---|---|---|---|
| 18 | 275 | 332 | 356 | 394 | 542 |
| 19 | 255 | 290 | 305 | 330 | 419 |

Again, essentially the same cure performance was obtained on paper at 225° F., whereas addition of the TAPB gave better bath life under ambient conditions.

EXAMPLE 7

Composition 20 was prepared by combining 100.0 g portions of a blend of a 225 cps vinyl dimethyl silyl stopped dimethylpolysiloxane polymer and 150 ppm Pt as a Pt-divinyltetramethyl disiloxane complex with 0.15 g Mono (2-Ethylhexyl) Maleate (MEHM). Composition 21 was prepared in the same way as Composition 20, except that 0.15 g MEHM+1.1 g TAPB was added in the system. 5.0 g portions of methyl hydrogen dimethyl polysiloxane crosslinker were added in Compositions 20 and 21. The minimum curetimes at 225° F. were 7 secs for each formulation. In addition, the following viscosities were measured:

| Comp No. | Initial Visc(cps) | 2 Hr Visc(cps) | 4 Hr Visc(cps) |
|---|---|---|---|
| 20 | 239 | 366 | 741 |
| 21 | 225 | 320 | 590 |

The results indicate that TAPB aided room temperature stability but did not impair cure at high temperature.

EXAMPLE 8

Two 50.0 g portions of a 225 cps vinyl dimethyl silyl stopped dimethylpolysiloxane polymer were mixed with 0.15 g Di(3-Butynyl) Maleate (DBTYNM). Composition 22 was prepared by adding 5.0 g of methyl hydrogen dimethyl polysiloxane crosslinker followed by 50.0 g of a blend of a 225 cps vinyl dimethyl silyl stopped dimethylpolysiloxane polymer and 300 ppm Pt as a Pt-divinyltetramethyl disiloxane complex. Composition 23 was prepared in the same way as Composition 22, except that 1.0 g of TBPB was added after the DBTYNM and before the crosslinker. Both Compositions 22 and 23 exhibited minimum curetimes of 10 sec at 225° F. In addition, the following viscosity data was obtained:

| Comp No. | Initial Visc(cps) | 2 Hr Visc(cps) | 4 Hr Visc(cps) |
|---|---|---|---|
| 22 | 228 | 765 | Soft Gel |
| 23 | 211 | 299 | 450 |

EXAMPLE 9

A masterbath was prepared by combining 600 g of a blend of a 225 cps vinyl dimethyl silyl stopped dimethylpolysiloxane polymer and 150 ppm Pt as a Pt-divinyltetramethyl disiloxane complex and 3.0 g dibutyl maleate (DBM). To 100.0 g portions of this masterbath was then added the following peresters:

| Example No. | Perester (Amnt in Grams) |
|---|---|
| 24 | None |
| 25 | TBPB (1.0) |
| 26 | TAPB (1.07) |
| 27 | TBEC (1.27) |
| 28 | TAEC (1.34) |

TBPB = t-Butyl Peroxybenzoate
TAPB = t-Amyl Peroxybenzoate
TBEC = OO-t-Butyl 1-(2-Ethylhexyl) Monoperoxy Carbonate
TAEC = OO-t-Amyl 1-(2-Ethylhexyl) Monoperoxy Carbonate At this point 5.0 g portions of methyl hydrogen dimethyl polysiloxane crosslinker were added and the viscosities of the resulting formulations were monitored over time at room temperature.

| Example No. | Initial Visc(cps) | 6 Hr Visc(cps) | 22 Hr Visc(cps) |
|---|---|---|---|
| 24 | 309 | 1350 | Gel |
| 25 | 230 | 310 | 475 |
| 26 | 223 | 318 | 500 |
| 27 | 222 | 334 | 623 |
| 28 | 221 | 324 | 572 |

Once again the change in viscosity was much lower in the presence of the peresters.

EXAMPLE 10

100.0 g portions of a blend of a 265 cps 5-hexenyl dimethylsilyl stopped dimethylpolysiloxane polymer and 150 ppm Pt as a Pt-divinyltetramethyl disiloxane complex were mixed with 0.40 g Dibutyl Maleate (DBM) and 4.0 g of a methyl hydrogen dimethyl polysiloxane crosslinker in the case of Composition 30 and 0.40 g DBM, 1.0 g t-Butyl Peroxybenzoate (TBPB), & 4.0 g crosslinker in Composition 31. The minimum curetimes of these formulations at 200° F. were 14 sec for Composition 30 and 16 sec for Composition 31. In addition, the following viscosity measurements were made over time:

| Comp No. | Initial Visc (cps) | 1 Hr Visc (cps) | 2 Hr Visc (cps) | 4 Hr Visc (cps) | 8 Hr Visc (cps) | 24 Hr Visc (cps) |
|---|---|---|---|---|---|---|
| 30 | 265 | 425 | 492 | 575 | 783 | Gel |
| 31 | 250 | 325 | 344 | 367 | 405 | 660 |

These comparative examples again show that an improvement in bulk bath life can be achieved without a substantial decrease in curespeed via the addition of a perester.

EXAMPLE 11

50.0 g portions of a 225 cps vinyl dimethyl silyl stopped dimethylpolysiloxane polymer were mixed with 0.15 g 1-ethynyl cyclohexanol (ECH). Then to Composition 32 was added 5.0 g of methyl hydrogen dimethyl polysiloxane crosslinker followed by 50.0 g of a blend of a 225 cps vinyl dimethyl silyl stopped dimethylpolysiloxane polymer and 300 ppm Pt as a Pt-divinyltetramethyl disiloxane complex. Composition 33 was prepared similarly except that 2.0 g of t-Amyl Peroxybenzoate (TAPB) was added after the ECH and before the crosslinker. Composition 32 exhibited a minimum curetime of 9 sec at 200° F. whereas Composition 33 was 10 sec. In addition, the following viscosity data was obtained:

| Comp No. | Initial Visc (cps) | 1 Hr Visc (cps) | 2 Hr Visc (cps) | 4 Hr Visc (cps) | 8 Hr Visc (cps) |
|---|---|---|---|---|---|
| 32 | 202 | 217 | 223 | 240 | 275 |
| 33 | 194 | 202 | 207 | 217 | 246 |

EXAMPLE 12

The Use of a Maleate/Perbenzoate Blend to Inhibit a Different Platinum Catalyst 100.0 g portions of a blend of a 225 cps vinyl dimethylsilyl stopped dimethylpolysiloxane polymer and about 75 ppm Pt as a Pt-octanol complex were mixed with 0.30 g Dibutyl Maleate (DBM) and 3.0 g of a methyl hydrogen polysiloxane crosslinker in the case of Composition 34 and 0.30 g DBM, 1.1 g t-Amyl Peroxybenzoate (TAPB), & 3.0 g crosslinker in Composition 35. The minimum curetimes of these formulations at 250° F. were 67 sec for Composition 34 and 54 sec for Composition 35. In addition, the following viscosity measurements were made over time:

| Example No. | Initial Visc (cps) | 2 Hr Visc (cps) | 6 Hr Visc (cps) | 22 Hr Visc (cps) |
|---|---|---|---|---|
| 34 | 186 | 212 | 287 | Hard Gel |
| 35 | 176 | 206 | 251 | 810 |

These comparative examples again show that an improvement in bulk bath life can be achieved via the addition of a perester.

Although specific examples of the invention have been described herein, it is not intended to limit the invention solely thereto but to include all variations and modifications falling within the spirit and scope of the appended claims.

What is claimed is:

1. A curable composition comprising (A) an organosilicon compound having an average of from one to three silicon-bonded monovalent radicals per silicon atom selected from the group consisting of hydrocarbon and halohydrocarbon radicals, an average of at least two of said monovalent radicals, per molecule of Component (A), being olefinic hydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms;

(B) an organohydrogensilicon compound containing at least two silicon-bonded hydrogen atoms per molecule thereof and an average of from one to two silicon-boned monovalent radicals free of aliphatic unsaturation, per silicon atom, selected from the group consisting of hydrocarbon and halohydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms;

(C) an amount of a platinum-containing catalyst sufficient to accelerate a reaction of said silicon-bonded olefinic hydrocarbon radicals with said silicon-bonded hydrogen atoms at room temperature;

(D) an amount of an inhibitor compound for the platinum-containing catalyst sufficient to retard said reaction at room temperature but insufficient to prevent said reaction at elevated temperature; and (E) an effective amount of a perester sufficient to further retard said platinum-containing catalyst at room temperature.

2. The composition of claim 1, wherein said perester comprises t-butyl peroxybenzoate, O,O-t-butyl 1-(2-ethylhexyl)monoperoxy carbonate, O,O-t-amyl 1-(2-ethylhexyl)monoperoxy carbonate, or t-amyl peroxybenzoate.

3. The composition of claim 1, wherein said inhibitor comprises diallyl fumarate, bis(methoxymethyl)ethyl maleate, di(3-butynyl)maleate, dibutyl maleate, or diallyl maleate.

4. The composition of claim 3, wherein said perester comprises t-butyl peroxybenzoate, O,O-t-butyl 1-(2-ethylhexyl)monoperoxy carbonate, O,O-t-amyl 1-(2ethylhexyl)monoperox carbonate, or t-amyl peroxybenzoate.

\* \* \* \* \*